United States Patent [19]

Tokura et al.

[11] Patent Number: 4,739,183
[45] Date of Patent: Apr. 19, 1988

[54] LOCAL AREA NETWORK FOR VEHICLE

[75] Inventors: Norihito Tokura, Nukata; Hisasi Kawai, Toyohashi, both of Japan

[73] Assignee: Nippon Soken, Inc., Nishio, Japan

[21] Appl. No.: 888,805

[22] Filed: Jul. 24, 1986

[30] Foreign Application Priority Data

Jul. 29, 1985 [JP] Japan .................... 60-167177

[51] Int. Cl.$^4$ .................................................. B60Q 1/00
[52] U.S. Cl. ........................................ 307/9; 307/10 R;
307/41; 340/52 R; 340/52 F; 340/825.06
[58] Field of Search .................... 307/9, 10 R, 10, 41;
340/55, 52 R, 52 F, 53, 56, 825.05–825.08,
825.54; 364/424, 424.1, 425, 426, 431.07, 440,
431.12, 438; 350/96.16; 455/600, 601, 608, 609,
610, 612, 613, 602, 603; 180/167, 170, 168, 169,
6.54, 197, 907, 233, 247; 324/160–172

[56] References Cited

U.S. PATENT DOCUMENTS

| | | | |
|---|---|---|---|
| 3,952,286 | 4/1976 | Wakamatsu et al. | 340/825.07 |
| 4,156,151 | 5/1979 | Borroni | 307/10 R |
| 4,302,841 | 11/1981 | McCulloch | 307/10 R X |
| 4,459,591 | 7/1984 | Hauber et al. | 340/825.05 X |
| 4,471,356 | 9/1984 | Gidl | 340/825.54 X |
| 4,516,121 | 5/1985 | Moriyama et al. | 340/52 F X |
| 4,538,262 | 8/1985 | Sinniger et al. | 307/10 R X |
| 4,554,461 | 11/1985 | Oho et al. | 307/40 |
| 4,584,487 | 4/1986 | Hesse et al. | 307/10 R |
| 4,594,571 | 6/1986 | Neuhaus et al. | 340/52 F |
| 4,652,853 | 3/1987 | Tagami et al. | 340/52 F |

Primary Examiner—William M. Shoop, Jr.
Assistant Examiner—Paul Ip
Attorney, Agent, or Firm—Cushman, Darby & Cushman

[57] ABSTRACT

Disclosed is a local area network for a vehicle which comprises a plurality of terminal stations each having an input/output port for various signals, a main-loop formed by series connection of the terminal stations and transmission lines, a sub-loop arranged in parallel to the main-loop and formed by series connection of the terminal stations and transmission lines, and controllers. One of the terminal stations receives a large amount of information such as an audio signal from an audio transmitter and one of the other terminal stations supplies a large amount of information such as an audio signal to an audio receiver. When the main-loop is in a normal operation state, the main-loop operates as a token-passing system and the sub-loop acts as a direct transmission route from one of the terminal stations to another terminal station, and when the main-loop is in an abnormal operation state, the main-loop is coupled with the sub-loop and the transmitting of information such as an audio signal is stopped, and simultaneously, the sub-loop is switched to the token-passing system. Thus, the double loops, i.e., the main-loop and the sub-loop, are effectively utilized. In addition, any decrease in the reliability of various signals transmission when a failure of the main-loop occurs, can be prevented.

12 Claims, 7 Drawing Sheets

LOCAL AREA NETWORK FOR VEHICLE

BACKGROUND OF THE INVENTION (1) Field of the Invention

The present invention relates to a local area network (hereinafter abbreviated to LAN) for a vehicle with a double loop constitution and for a multiplex transmission of various signals in an automobile.

(2) Description of the Related Art

Hitherto, to simplify wiring inside a vehicle, it was proposed that a plurality of nodes be arranged in the automobile, the nodes being interconnected with one another by multiplex signal transmission lines. Switching signals, diagnostic signals, and the like from various apparatuses equipped on the vehicle could then be transmitted as a multiplex signal. Also, in order to withstand noise, the use of an optical fiber transmission line was proposed. Star type, loop type, and the like LAN systems using an optical fiber are known. In these systems, the loop type LAN is advantageous because the total length of the optical fiber is short and the optical fibers are simply arranged.

In the loop type LAN, however, a problem arises in that if only one portion of the loop breaks down or causes abnormal operation, none of the nodes will be able to transmit signals. To resolve this problem, another system has been proposed wherein the loop is formed in a double loop constitution, i.e., main-loop and sub-loop using this system, if the main-loop cannot transmit the signals, a portion of the sub-loop is used to transmit the signals as a loopback system instead of the main-loop; and the reliability against failure is increased.

Nevertheless, in this case, as long as the LAN is in a normal operation state the other (sub-loop) of the double loops is not necessary. Also, the size of the LAN system must be increased to enable use of this countermeasure to an abnormal operation, and this is very uneconomical.

The inventors of the present invention have conceived an effective application of the sub-loop in the case of the double loop constitution.

The vehicle signals transmitted by the LAN include signals such as an audio signal which transmits a large amount of information at a certain time interval, and signals generated intermittently at a certain time interval such as signals detecting an abnormal state, e.g., lamp breakdown or the like, and turning the switches ON or OFF in the various apparatuses.

Accordingly, another problem arises in that when an attempt is made to transmit all of the abovementioned signals by using only one transmission line which is comparatively small in scale, such as an LAN for a vehicle, the audio signal, for example, is band limited when played back.

The related arts for this invention are disclosed in Japanese Unexamined Patent Publications (Kokai) Nos. 58-70655 and 58-70658.

The present invention was made in consideration of the above-mentioned problems.

SUMMARY OF THE INVENTION

An object of the present invention is to provide a local area network for a vehicle wherein most urgent signals are transmitted by a main-loop using a token-passing system, and in addition to the main-loop, a sub-loop is provided and less urgent signals and a large amount of information transmitted at a certain time interval can be transmitted thereon at a high speed. Also, when an abnormal state occurs in the main-loop, the main-loop is connected to the sub-loop and the sub-loop becomes the transmission line using the token-passing system.

In the present invention, in order to accomplish the above-mentioned object, the following LAN for a vehicle is provided.

This LAN comprises a plurality of terminal stations located in the vehicle and having input/output ports for various signals; transmission members for interconnecting the plurality of terminal stations; a main-loop formed by series connection of the plurality of terminal stations and the transmission members; and a sub-loop having other transmission members, formed by series connection of the plurality of terminal stations and the other transmission members, and arranged parallel to the main-loop.

The plurality of terminal stations comprises a first terminal station to which an input device is connected to receive a large amount of information in a certain time interval; and a second terminal station to which an output device is connected to supply a large amount of information in a certain time interval. In addition, the LAN comprises a control means provided in at least one of the plurality of terminal stations; by which, when the main-loop is in the normal operation state, the main-loop is used as a token-passing system and the sub-loop is used as a direct transmission line from the first terminal station to the second terminal station; and when the main-loop is in an abnormal state, the main-loop is coupled to the sub-loop and the transmission of the signal from the input device is stopped, and the sub-loop is used as the token-passing system.

By using the above-mentioned LAN, when the main-loop is in a normal operation state, information except for the information supplied from the input device to the first terminal station is transmitted multiplexly through the main-loop by the token-passing system. In addition, a large amount of information generated in a certain time interval is supplied to the first terminal station, and when the information passes through the other terminal stations, processing of the information is not carried out, and the information is transmitted directly to the second terminal station. Therefore, when the transmission of a large amount of information in a certain time interval, such as audio information, is necessary, the information can be transmitted at a very high speed without influence from other information. Also, distortion of the output signal in the output device can be reduced.

Further, if the main-loop is in an abnormal operation state, the control means couples the sub-loop to the main-loop, and the transmission system is switched from the direct system to the token-passing system. Thus, the most urgent information formerly transmitted multiplexly through the main-loop can be then transmitted through the sub-loop without interruption.

According to the present invention, in a normal operation, a packet signal including a wheel revolution signal or the like, which requires a high transmission reliability is transmitted by the token-passing system through the main-loop, and a signal such as an audio signal, which requires a high speed transmission and continuous processing can be transmitted through the sub-loop, at a high speed without distortion, and thus the double loop can be utilized very effectively. If the main-loop is in an abnormal operation state, the signal transmission through the sub-loop is interrupted, a portion of the sub-loop or all of the sub-loop is switched to the token-passing system, backup measures such as a loop-back or the like are taken, signals requiring a high transmission reliability, i.e., wheel revolution signal or the like, are transmitted without interruption, and thus the reliability of the transmission operation is maintained at a high level.

DESCRIPTION OF THE PREFERRED EMBODIMENTS

Figure 1:
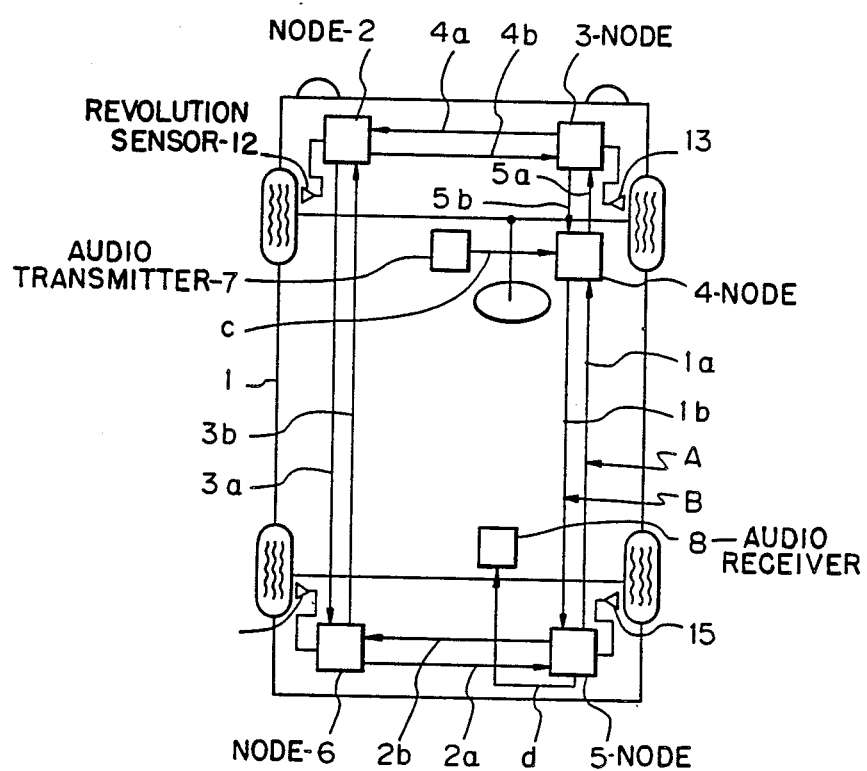
FIG. 1 is a diagram illustrating a constitution of an LAN for an automobile according to an embodiment of the present invention.

The present invention will now be explained based on an embodiment shown in the figures. FIG. 1 shows an arrangement of each terminal station (hereinafter called node) of a multiplex signal transmission apparatus for an automobile (i.e., LAN for an automobile) and apparatuses connected to the nodes in a car body 1.

The apparatus shown in FIG. 1 comprises a ring type network constituting a double loop. A wheel revolution signal which is necessary to control the traction of the vehicle, and which requires real time control, is transmitted through one of the loops, i.e., the main-loop. The other loop, i.e., the sub-loop, transmits an audio signal from a car stereo player or the like, which requires an extremely high transmission speed and continuous processing, at the same time as the main-loop carries out transmission of the wheel revolution signal.

In the apparatus of FIG. 1, reference numerals 2 to 6 denote nodes, 1a to 5a denote optical fibers (or optical fiber cables) which are transmission members and constitute the main-loop A for the signal transmission together with the nodes 2 to 6, and 1b to 5b denote optical fibers which constitute the sub-loop B for the signal transmission together with the nodes 2 to 6. Numeral 7 denotes an audio transmitter which supplies a digital audio signal, which is applied to the node 4, and numeral 8 denotes an audio receiver which receives the digital audio signal from the node 5 and converts it to perceivable audio. Numerals 12, 13, 15, and 16 denote revolution sensors which detect the number of revolutions of each wheel and supply number of revolutions signals to the nodes 2, 3, 5, and 6, respectively.

Figure 2:
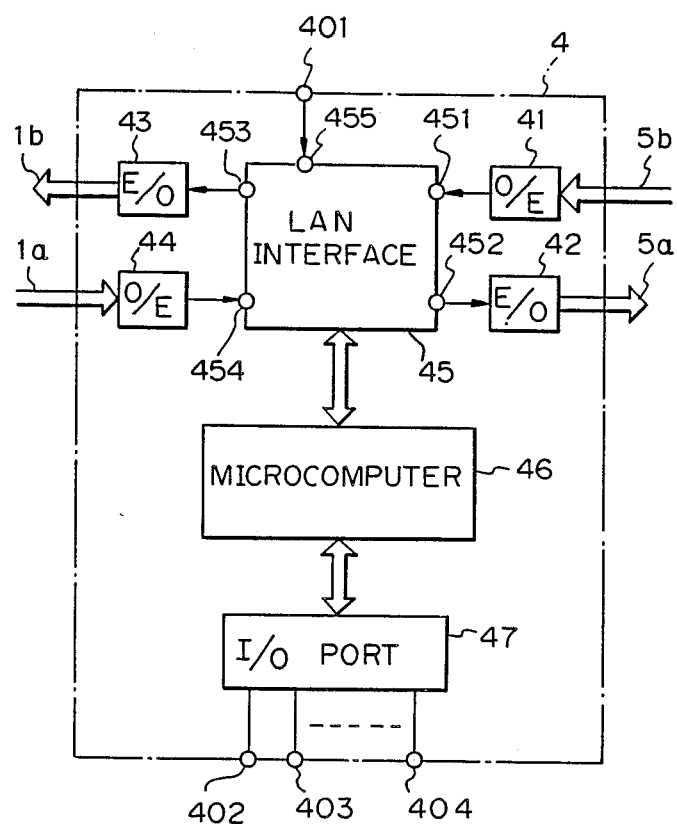
FIG. 2 is a block diagram of node 4 in FIG. 1.

FIG. 2 shows the constitution of the node 4. A optical signal from the optical fiber 5b is converted to an electric signal through an optical/electric converter 41 (O/E), and is applied to a terminal 451 of an LAN interface 45. An electric signal from a terminal 452 of the LAN interface 45 is converted to an optical signal through an electric/optical converter 42 (E/O) and supplied to the optical fiber 5a. Similarly, an optical signal from the optical fiber 1a is converted to an electric signal through an O/E 44 and applied to the LAN interface 45. An electric signal from a terminal 453 of the LAN interface 45 is converted to an optical signal through E/O 43 and supplied to the optical fiber 1b.

A terminal 401 is connected to the audio transmitter 7 through a signal line C shown in FIG. 1. A digital audio signal is applied to the LAN interface 45 via the terminal 401 and a terminal 455. A switch electrically connecting the terminals 451 to 454, and a token-passing type LAN controller, are provided in the LAN interface 45. The LAN interface 45 is controlled in the manner shown by the flowcharts in FIGS. 8 and 9. Also, the LAN interface 45 is connected to a microcomputer 46 and an input/output (I/O) port 47 through bus lines. The microcomputer 46 controls the traction of the vehicle in accordance with the signal transmitted to the LAN interface 45.

Figure 3:
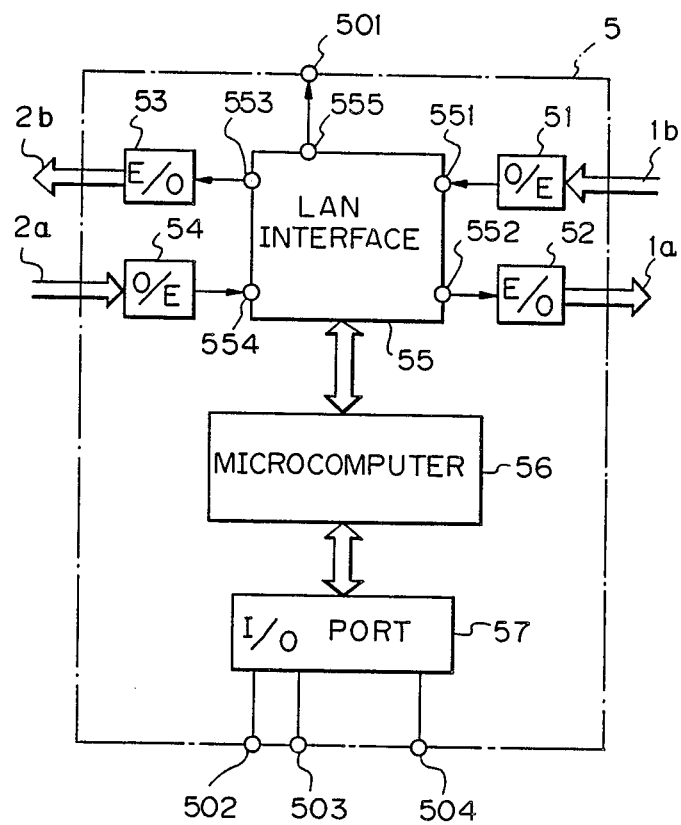
FIG. 3 is a block diagram of node 5 in FIG. 1.

FIG. 3 is a diagram showing the constitution of the node 5, which constitution is substantially the same as that of the node 4 in FIG. 2, except that the digital audio signal is supplied to the audio receiver 8 via terminals 555 and 501.

The other nodes 2, 3, and 6 are the as same as the node 4 in FIG. 2 except that they are not provided with input/output terminals for the digital audio signal.

The operation of the LAN during a normal operation is now explained.

The main-loop (constituted by the optical fibers 1a to 5a and the nodes 2 to 6) of the LAN for the automobile according to an embodiment of the present invention shown in FIG. 1 is constructed as a token-passing type loop network. In the main-loop, a specific bit series (e.g., 8 bits), called a token packet, circulates through the loop. Only the node obtaining the token packet is given access, and thus can receive or transmit the signal.

Figure 4:
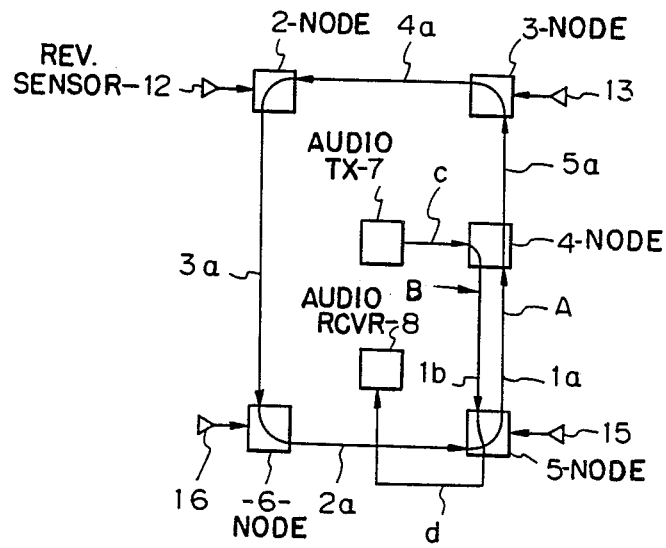
FIG. 4 is a diagram illustrating a signal flow during a normal state in the LAN of FIG. 1.

In the LAN for the automobile in FIG. 1, during a normal operation, each node operates so that the main-loop in FIG. 4 is formed. That is, in the node 5 in FIG. 3, the following signal flow is formed. Node 6→optical fiber 2a→O/E 54→LAN interface 55 (LAN controller)→E/O 52→optical fiber 1a→node 4.

Similarly, in node 4 in FIG. 2, the signal flow is as follows: node 5→optical fiber 1a→O/E 44→LAN interface 45 (LAN controller)→E/O 42→optical fiber 5a→node 3.

In the nodes 3, 2, and 6, the signal is processed in the same way as in the nodes 5 and 4, and the signal is transmitted sequentially. As a result, the main-loop is formed as shown in FIG. 4, and the signal circulates through the main-loop. Thus the token-passing type loop network is completed.

In the main-loop, as a safety device for the vehicle 1 in FIG. 1, since a traction control mechanism is provided, revolution signals from the revolution sensors 12, 13, 15, and 16, which detect the number of wheel revolutions, must be transmitted to node 4. At node 4, the transmitted revolution signals are processed for the traction control, the processed signal drives an oil pressure valve (not shown) to prevent a loss of traction and vehicle safety is thus assured.

Figure 9:
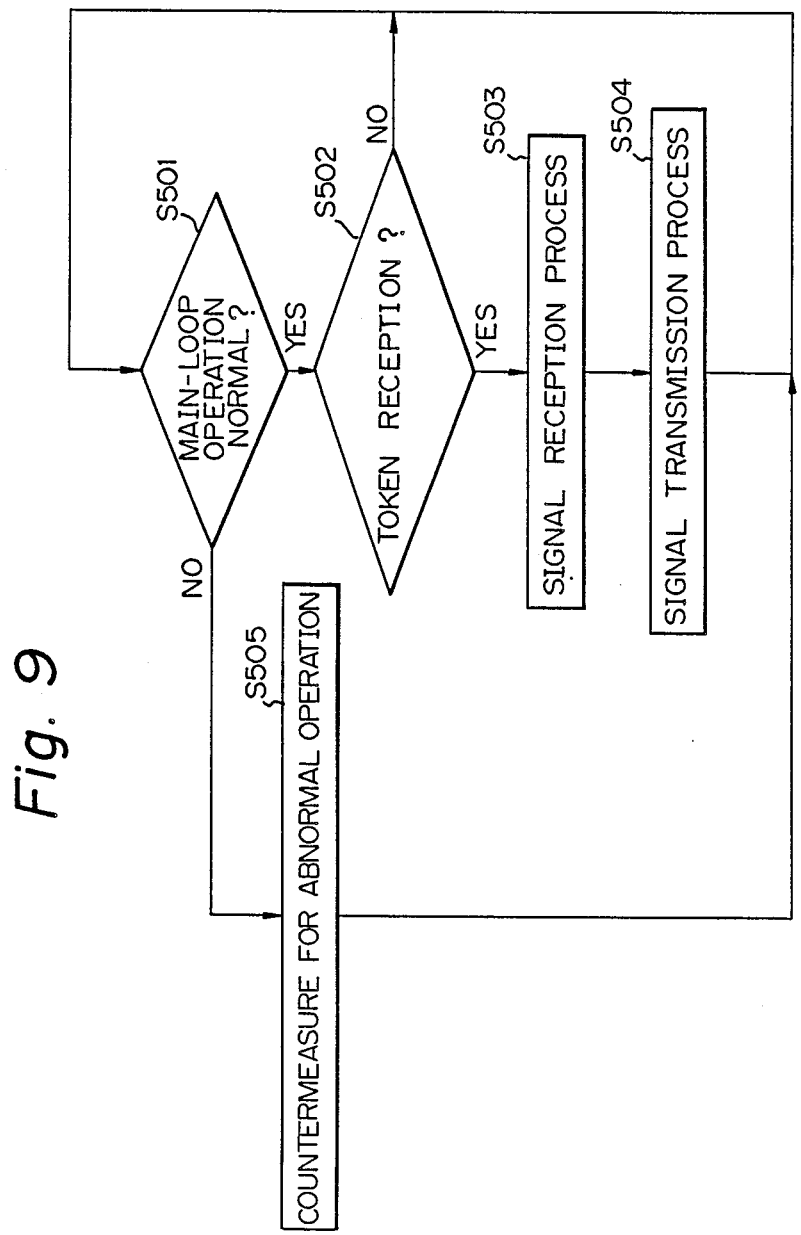
FIG. 9 is a flow chart for node 5 of FIG. 3.

The signals from the revolution sensors 12, 13, 15, and 16 are applied to the nodes 2, 3, 5, and 6, respectively, and transmitted to the node 4 through the main-loop. For example, in the case of the revolution sensor 15, the revolution signal N5 is applied to a terminal 502 of the node 5 in FIG. 3, and then applied to a microcomputer 56 through the input/output (I/O) port 57. The token packet successively gains access to the nodes in the counterclockwise direction of the main-loop. FIG. 9 shows a flowchart for the node 5. When the main-loop is in a normal operation state, the process advances from step S501 to step S502, and in the node 5, detection of the token packet reception (access by node) takes place. After the detection, at step S503 the signal reception is processed, and a YES or NO answer to a transmission request from the node 4 regarding the revolution signal N5 is examined. If YES at step S504, the revolution signal N5 is applied to the LAN interface 55 from the microcomputer 56, and the revolution signal N5 is connected to the token packet and transmitted to the node 4.

Similarly, in the nodes 6, 2, and 3, the revolution signals N6, N2, and N3 from the revolution sensors 16, 12, and 13 are applied to the nodes 6, 2, and 3, respectively. When each node is accessed by the token packet and the transmission request for the revolution signal is supplied from the node 4, each revolution signal is connected to the token packet by the LAN interface of each node, and transmitted to the node 4.

Figure 8:
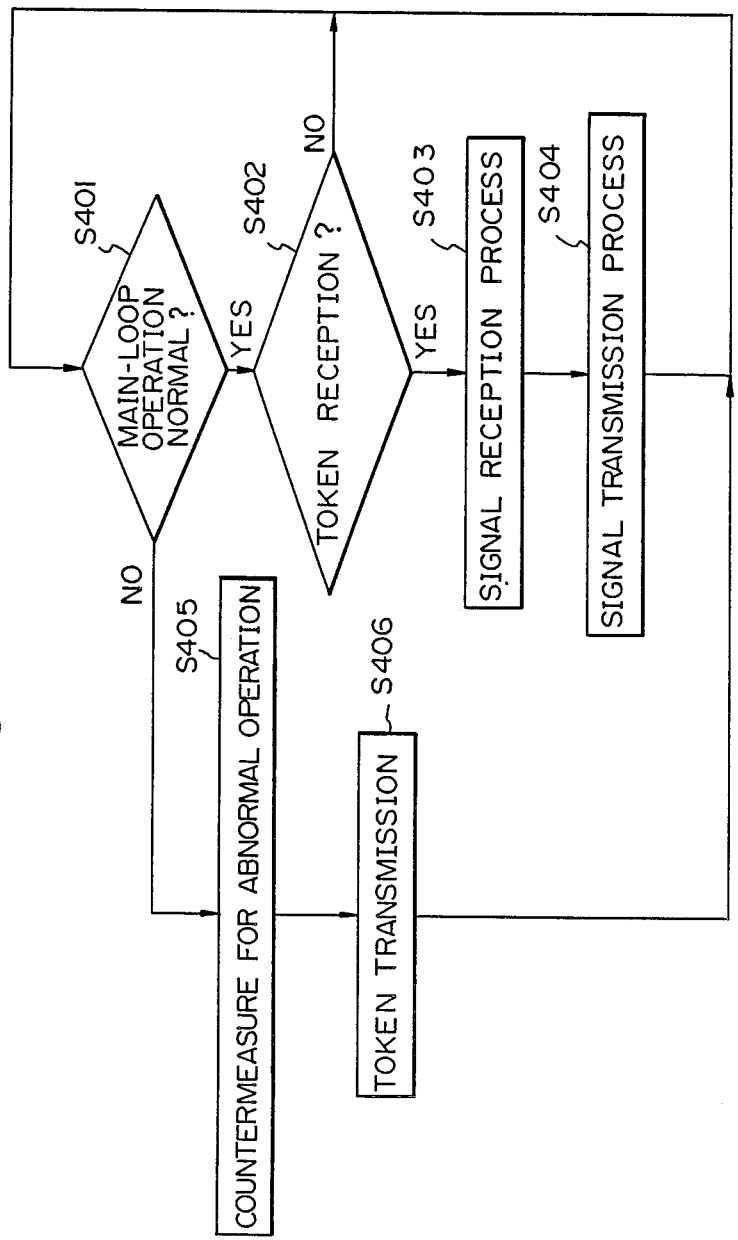
FIG. 8 is a flow chart for node 4 of FIG. 2.

FIG. 8 shows a flowchart of the process at the node 4. At step S401, the node determines whether or not the main-loop is in a normal operation state. Then, at step S402, if the operation state is normal, detection of the token packet reception takes place. After the detection, the signal reception process is performed at step S403. At step S404, if the revolution signal has been transmitted from each node, the LAN interface 45 receives the revolution signals and transmits them to the microcomputer 46. The microcomputer 46 operates to control the traction, after receiving each of the revolution signals N2, N3, N5, and N6, and the operating results are supplied from the input/output port 47 to drive the oil pressure control valve (not shown).

During a normal operation, the audio signal is transmitted through the sub-loop as shown in FIG. 4, without using the token-passing system.

Namely, in the node 4 in FIG. 2, the following signal flow is formed: audio transmitter 7→terminal→401→LAN interface 45 (the terminal 455 is connected to the terminal 453 by inner connection)→E/O 43→optical fiber 1b. A signal processing is not performed in the LAN interface 45, as the signal is only passing through. Similarly, in the node 5 in FIG. 3, the signal flow is as follows: optical fiber 1b→O/E 51→LAN interface 55 (the terminal 551 is connected to the terminal 555 by inner connection)→terminal 501→audio receiver 8. The signal only passes through the LAN interface 55 and is transmitted directly from the O/E 51 to the terminal 501.

As mentioned above, the digital audio signal is transmitted from the audio transmitter 7 to the audio receiver 8 through the node 4, the optical fiber 1b, and the node 5. That is, using a portion of the sub-loop, the audio signal is continuously transmitted. Although, in this embodiment, the interval between the nodes 4 and 5 in the sub-loop is used for the audio signal transmission, it is possible for the other node intervals (for example, the interval between the nodes 4 and 2) to be used; the audio signal passing directly through the nodes, and being transmitted through the node interval. The designation of the node interval is determined by sending a command signal from the node 4 to each node on the main-loop.

The process for an abnormal operation state is now explained. In the LAN for the automobile in FIG. 1, if the signal cannot be transmitted through the optical fibers 1a to 5a forming the main-loop because, for example, of a partial disconnection, the main-loop is in an abnormal operation state. An abnormal operation state of the main-loop is determined at step S401 of the control flowchart in the LAN interface 45 of the node 4 shown in FIG. 8, by measuring the time taken for the token packet to circulate around the main-loop. If the time is longer than a predetermined time, the operating state is determined to be abnormal, and the process flows to step S405 to enable a countermeasure to the abnormal state to be taken.

Details of the countermeasure taken for an abnormal state, by which the node 4 sends commands to the other nodes, is now explained using three cases as examples. In the countermeasure for an abnormal operation, these transmission of the audio signal through the sub-loop is stopped, a portion or all of the sub-loop is connected to the main-loop, and the token packet and the revolution signals are successively and continuously transmitted through the sub-loop as a bypass route.

Figure 5:
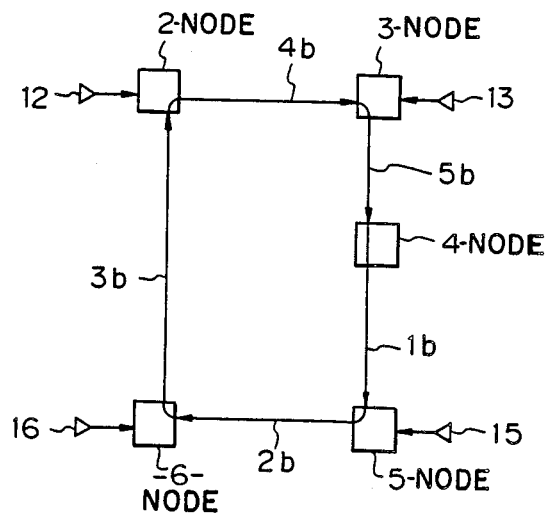
FIGS. 5, 6, and 7 are diagrams illustrating a signal flow during an abnormal state in the LAN of FIG. 1.
Figure 6:
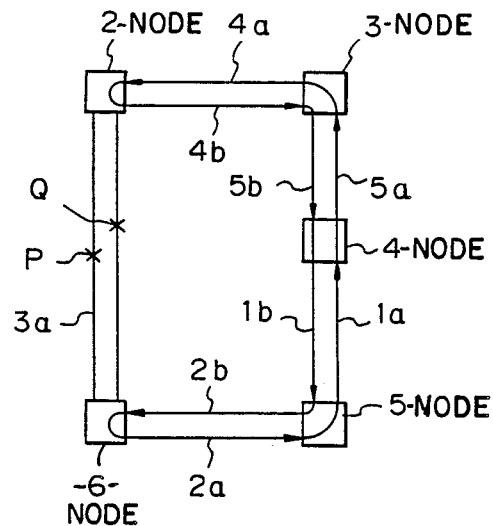
Figure 7:
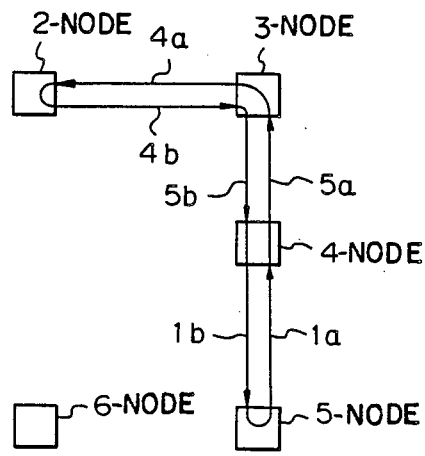

The loop constitutions during an abnormal case are as in the three cases shown in FIGS. 5 to 7.

In the case shown in FIG. 5, where a plurality of portions of the main-loop have failed, the main-loop is not used in its entirety at all, and the sub-loop is used instead of the main-loop. Namely, the operations carried out by the main-loop are completely taken over by the sub-loop.

In the case shown in FIG. 6, where a point P or both points P and Q on the optical fiber 3a are disconnected, the loop is turned at the node 2 and the node 6 (loop-back method) and the signal flows as follows: node 4→optical fiber 5a→node 3→optical fiber 4a→node 2→optical fiber 4b→node 3→optical fiber 5b→node 4→optical fiber 1b→node 5→optical fiber 2b→node 6→optical fiber 2a→node 5→optical fiber 1a→node 4.

In the above route: optical fiber 4b→node 3→optical fiber 5b→node 4→optical fiber 1b→node 5→optical fiber 2b of the sub-loop, the signal is passed through the LAN interfaces in the nodes 3, 4, and 5. For example, in the node 5 shown in FIG. 3, the signal from the optical fiber 1b is applied to the terminal 551 of the LAN interface 55 through the O/E 51, the signal is passed through the LAN interface 55 to the terminal 553 as it stands, and is then supplied to the optical fiber 2b through the E/O 53. The nodes 3 and 4 operate in the same way as the node 5. In the node 2, the signal from the optical fiber 4a is applied to the LAN interface through the O/E, and supplied to the optical fiber 4b through an LAN controller located in the LAN interface and the E/O. Similarly, in the node 6, the signal from the optical fiber 2b is supplied to the optical fiber 2a through the LAN interface in the node 6.

By the above-mentioned method shown in FIG. 6, another loop is formed to replace the main-loop for a normal operation, if there is a failure in a portion of the optical fiber in the main-loop.

In the case shown in FIG. 7, where the node 6 is in an abnormal operation state, the loop is turned back at the nodes 2 and 5 (loop-back method), and the signal flows as follows: node 4→optical fiber 5a→node 3→optical fiber 4a→node 2→optical fiber 4b→node 3→optical fiber 5b→node 4→optical fiber 1b→node 5→optical fiber 1a→node 4.

In the above route: optical fiber 4b→node 3→optical fiber 5b→node 4→optical fiber 1b of the sub-loop, the signal is made to pass through in the same way as in the case of FIG. 6 by operating the LAN interfaces in the nodes 3 and 4.

By the above-mentioned method shown in FIG. 7, if the node 6 is in an abnormal operation state, a signal except for the signal related to the node 6 is transmitted normally and a failure of the whole of the LAN can be avoided.

In the above-explained three cases shown in FIGS. 5 to 7, although it is necessary to stop transmitting the audio signal through the sub-loop, the traction control function or the like which is important for the safety of the automobile can be performed without fail.

In the above description, only the revolution signal has been treated as a signal transmitted through the main-loop. However, in practice, signals relating to various switches, lamps, motors, sensors, and the like are transmitted.

We claim:

1. A local area network for a vehicle comprising:
a plurality of terminal stations located in the vehicle, each having an input/output port for various signals;
transmission means for interconnecting the plurality of terminal stations;
a main-loop including a series connection of the plurality of terminal stations and the transmission means;
a sub-loop, arranged in parallel to the main-loop, including a series connection of the plurality of terminal stations and the transmission means;
said plurality of terminal stations including first and seond terminal stations, said first terminal station being connected to an input device for receiving information therefrom, and said second terminal station being connected to an output device for supplying information thereto; and
control means, provided at at least one of the plurality of terminal stations, for maintaining a token-passing system in the main-loop, and for detecting an abnormal state of the main loop and transmitting said information directly from the first terminal station to the second terminal station through the sub-loop independent of the transmission through the main-loop during a normal operation state of the main-loop, and for coupling the main-loop with the sub-loop in a loopback configuration, stopping the signal transmission between said first and second terminal stations, and changing the sub-loop to the token-passing system when detecting an abnormal operation state of the main-loop.

2. A local area network for a vehicle as set forth in claim 1, wherein the transmission means are optical fiber cables.

3. A local area network for a vehicle as set forth in claim 1 or 2, wherein the input device receiving information is an audio transmitter for supplying a digital audio signal.

4. A local area network for a vehicle as set forth in claim 1 or 2, wherein the output device supplying information is an audio receiver for receiving a digital audio signal.

5. A local area network for a vehicle as set forth in claim 1 or 2, wherein a wheel revolution signal, various switching signals, lamp signals, signals from motors, and/or sensor signals are transmitted through the main-loop.

6. A local area network for a vehicle as set forth in claim 1, wherein the terminal station comprises a plurality of optical/electric converters, a plurality of electric/optical converters, a local area network interface, and a microcomputer; and the local area network interface comprises a switch means for electrically interconnecting the terminal thereof and a token-passing controller.

7. A local area network for a vehicle, comprising:
a plurality of terminal nodes, located within said vehicle, said terminal nodes including at least (a) a first terminal node for receiving first information of a type which can be interrupted during an abnormality, and (b) a second terminal node for transmitting said first information to a location in said vehicle when said first information is received;
means for interconnecting said terminal nodes in:
(a) a main-loop formed by a series connection of said terminal nodes, and
(b) a sub-loop, formed by a series connection of said terminal nodes, said sub-loop in parallel with said main-loop; and
control means for:
(a) detecting any abnormality in either loop;
(b) maintaining said first information passing from said first terminal node to said second terminal node normally, and interrupting said first information passing when said abnormality is detected; and
(c) maintaining a local area network token passing system in said main-loop normally, and at least in said sub-loop during said abnormality.

8. A network as in claim 7 wherein at least one of said terminal nodes includes means for selectively interconnecting said main-loop and said sub-loop into a loopback configuration, and said control means is also for:
(d) commanding said interconnecting of at least one of said terminal nodes when a first predetermined abnormality is detected.

9. A network as in claim 8 wherein said control means is also for:
(e) using said sub-loop exclusively during a detection of a second predetermined abnormality.

10. A network as in claim 7 wherein said first terminal node is an audio transmitter and said second terminal node is an audio receiver.

11. A network as in claim 7 wherein said interconnecting means including a plurality of optical cables for interconnecting said terminal nodes.

12. A network as in claim 11 wherein each said terminal node includes at least one optical/electric converter for converting information on said optical cable to an electric signal, at least one electric/optical converter for converting information in said node into an optical signal, a local area network interface coupled to said converters, and a microcomputer coupled to the interface, and a token-passing controller, and wherein said local area network interface comprises switch means for electrically interconnecting the terminal thereof and said token-passing controller.

* * * * *